United States Patent [19]

Balassa

[11] 3,761,589

[45] Sept. 25, 1973

[54] PESTICIDAL PHOSPHOROTHIOATE COMPOSITIONS AND METHODS OF PREPARING THEM

[75] Inventor: Leslie L. Balassa, Blooming Grove, N.Y.

[73] Assignee: Balchem Corporation, Slate Hill, N.Y.

[22] Filed: Jan. 22, 1971

[21] Appl. No.: 109,062

Related U.S. Application Data

[63] Continuation-in-part of Ser. No. 795,073, Jan. 29, 1969, abandoned, which is a continuation-in-part of Ser. No. 660,237, Aug. 14, 1967, abandoned.

[52] U.S. Cl. ............... 424/200, 424/213, 424/218, 424/358
[51] Int. Cl. .............................................. A01n 9/36
[58] Field of Search .................. 600/277; 795/73; 424/200, 196, 83, 213, 218, 358

[56] References Cited
UNITED STATES PATENTS

| | | | |
|---|---|---|---|
| 2,996,426 | 8/1961 | Galloway | 424/213 X |
| 3,318,769 | 5/1967 | Folckemer et al. | 424/78 |
| 3,212,967 | 10/1965 | McFadden et al. | 424/78 |
| 2,529,681 | 11/1950 | Flenner | 424/354 |
| 3,089,807 | 5/1963 | Trademan et al. | 424/219 |
| 2,966,440 | 12/1960 | Gerolt | 424/278 |

OTHER PUBLICATIONS

Ott, Emil – Cellulose & Its Derivatives–Interscience Pub. Inc., 1946, pp. 801–806.

Gregory, Thomas – Uses & Applications of Chemical & Related Materials, Reinhold Pub., 1939, pp. 84 & 154–155.

Abraham, H. – Asphalts & Allied Substances – Nostand Pub., 1961, pp. 9, 10, 172 & 173.

Pesticide Index, Frear–1961, pg. 79.

*Primary Examiner*—Albert T. Meyers
*Assistant Examiner*—Leonard Schenkman
*Attorney*—Birch, Swindler, McKie & Beckett

[57] ABSTRACT

The phosphorothioate pesticidal compositions O, O-diethyl O-(2-isopropyl-4-methyl-6-pyrimidinyl) phosphorothioate, O,O-dimethyl S-(1,2-dicarbethoxyethyl) phosphorodithioate and O,O-diethyl O-p-nitrophenyl phosphorothioate are well known as agricultural pesticides; however, their high volatility and ready hydrolysis under ambient field conditions leads to substantial loss of the pesticide with a corresponding reduction in its effectiveness. The introduction of certain normally solid solutes having melting points below about 100° C into the pesticidal composition and the absorption of the resulting solution onto an inert porous carrier significantly reduces this problem. In addition, these and higher melting solutes may be dissolved in a volatile solvent, the phosphorothioate may be dissolved in a volatile solvent, the resulting solution may be absorbed onto an inert porous carrier, and the solvent volatized to provide useful phosphorothioate pesticidal compositions.

18 Claims, No Drawings

PESTICIDAL PHOSPHOROTHIOATE COMPOSITIONS AND METHODS OF PREPARING THEM

This invention relates to agricultural pesticides of the phosphorothioate type.

The phosphorothioate group of agricultural chemicals and in particular O,O-diethyl O-(2-isopropyl-4-methyl-6-pyrimidinyl) phosphorothioate, O,O-dimethyl S-(1,2-dicarbethoxyethyl) phosphorodithioate and O,O-diethyl O-p-nitrophenyl phosphorothioate have been found to be quite effective as pesticides; however, when applied to plants in the field during the growing season, the effectiveness of the chemical dissipates quickly. This has been traced to hydrolysis decomposition of the compound, and to significant evaporation of the compound due to its high vapor pressure at the temperatures prevailing during the growing season.

It has now been found that certain specific compounds can be dissolved in these phosphorothioate compounds so as to significantly suppress the volatilization and hydrolysis of the compounds. The normal method of introducing the solute is to melt it together with the phosphorothioate compound at an elevated temperature such as, for example, 80° C until all of the solute dissolves. A suitable inert porous carrier can then be blended into the mix to provide a normally solid composition containing the phosphorothioate compound in effective amounts for slow release on application in the fields and which is not unduly dissipated under ambient field conditions.

The solutes contemplated for the purposes of the present invention include petroleum asphalts, the oxidized or blown petroleum asphalts, microcrystalline paraffin waxes, linear polystyrenes (including waxy polystyrene homopolymer and the co-polymers having styrene as a major component as well as the nuclear substituted polystyrenes) and ethyl cellulose. All of these are generally solid at normal conditions (although some are tacky) but melt below about 100° C. The foregoing materials are selected for their solubility in and compatibility with the particular phosphorothioate.

Of particular value for the purposes of the present invention is oxidized petroleum asphalt, having a melting point range of 180°–200° F.

Typical inert porous supports include such materials as vermiculite, expanded perlite, granulated corn cob and sintered clay granules. After the melt has been suitably absorbed in the inner carrier, it is preferably dusted using a suitable inert powder such as vermiculite powder, powdered perlite, clay, talc and the like. Dusting of the final particle minimizes tackiness and thereby reduces the tendency of the pesticide-containing absorbent to agglomerate.

The chemical name, formula and trade-name for the phosphorothioate pesticides advantageously utilized in the present invention are set forth in Table I.

TABLE I

| Chemical name | Formula | Trade name |
|---|---|---|
| O,O-diethyl O-(2-isopropyl-4-methyl-6-pyrimidinyl) phosphorothioate. | (structure) | Diazinon. |
| O,O-dimethyl S-(1,2-dicarbethoxyethyl) phosphorodithioate. | (structure) | Malathion. |
| O,O-diethyl O-p-nitrophenyl phosphorothioate. | (structure) | Parathion. |

While all three of the foregoing compounds are useful in the practice of the present invention for simplicity the invention will be illustrated with the preferred compound, Diazinon.

EXAMPLE I

Diazinon in an amount of 37.5 parts by weight and 12.5 parts by weight of oxidized asphalt (180/200° F melting point, Humble Oil and Refining Co.) were mixed and heated to about 80° C in an oil bath. Mixing was continued until the asphalt completely dissolved in the Diazinon. Expanded vermiculite granules in an amount of about 40 parts by weight were gradually added to the solution with constant mixing, while maintaining the temperature of the oil bath between about 70°– 80° C. The mixing was continued until the liquid was absorbed by the vermiculite. The batch was then cooled to about 20° C and about 10 parts by weight of vermiculite powder added and distributed throughout the batch, thereby coating the surface of the granules. The product was then tested for rate of loss of Diazinon.

EXAMPLE II

Example I was repeated except that petroleum asphalt having a melting point of 210° F (Pioneer 210 asphalt compound, Witco Chemical Co.) was substituted for the oxidized asphalt.

EXAMPLE III

The procedure of Example I was repeated except that the quantity of Diazinon was increased to 40 parts by weight and 10 parts by weight of microcrystalline wax (Multi-wax W-445 Witco Chemical Co.) was employed in place of the oxidized asphalt. Multi-wax W-445 is a medium melting point white microcrystalline wax. The wax has a needle penetration (ASTMD-1321) at 77° F of 30, a melting point (ASTM D-127) of 173° F and a Saybolt viscosity, SUS (ASTM D-88) at 210° F of 85.

EXAMPLE IV

Example III was repeated except that polystyrene resin (Dow resin PS-2) was substituted for the microcrystalline wax. The polystyrene was a solid at room temperature and was soluble in and compatible with the Diazinon. The polystyrene resin, Dow resin PS-2, has an average molecular weight of 22,000, a viscosity (30 percent solution in toluene) cps. of 12 to 20 and a softening range, ° F, of 140 to 200.

EXAMPLE V

Example III was repeated except that ethyl cellulose (7 cps grade, Hercules, Inc.) was substituted for the microcrystalline wax.

EXAMPLE VI

This was a control example using 50 parts by weight of Diazinon, 40 parts by weight of expanded vermiculite granules and 10 parts by weight of expanded vermiculite powder. The procedure was the same as for Example I.

EXAMPLES VII – VIII

Following the procedure of Example I, beeswax and carnauba wax were substituted for the oxidized asphalt. The resulting product had properties corresponding to those found with Example II.

PRODUCT TESTING

Two gram samples of the products of Example I through VI were placed in separate aluminum dishes and exposed to the continuous sweep of an air stream maintained at about 23° C and about 80 percent relative humidity. At 48 hours, 72 hours and 150 hours of exposure, the samples were weighed and the loss in weight calculated. The results are set forth in Table II.

TABLE II

| Material | Percentage lost during hours exposed | | |
|---|---|---|---|
| | 48 Hrs. | 72 Hrs. | 150 Hrs. |
| Example I | 0 | 0 | 1 |
| Example II | 0 | 3 | 17.5 |
| Example III | .6 | 6 | 9 |
| Example IV | 6 | 10.5 | 11 |
| Example V | 6 | 9 | 11 |
| Example VI | 18 | 23 | 28 |

As will be seen from Table II, dissolving the various solutes in the pesticidal composition greatly reduced the tendency of the pesticide to volatilize and/or hydrolyze prematurely. The slow release is sufficent to maintain the pesticidal activity of the composition over a far longer period of time than was previously possible, thereby permitting economy in usage and a significant reduction in the number of applications necessary to protect a field from pests. Indeed, after 150 hours of exposure, the composition of Example I lost only 1 percent due to volatilization and hydrolysis, whereas the control sample lost 28 percent. It will, therefore, further be seen that oxidized asphalt is the preferred solute for the purposes of the present invention.

Accordingly, for the purposes of the present invention, the preferred composition comprises expanded vermiculite granules in which there has been absorbed a substantial quantity of a solution of a major amount of the phosphorothioate chemical Diazinon, and a minor amount of oxidized asphalt, particularly when the final product is then again blended with expanded vermiculite powder. The relative proportions are not critical. Obviously, there should be at least a significant proportion of pesticide contained in the vermiculite, e.g., at least 5 percent. As a practical matter, however, the relative proportions of the pesticide should be substantially greater up to the point of maximum absorption by the inert carrier. Similarly, the amount of the particular solute added to the pesticide is not critical. A very slight amount of the solute will provide a slight improvement in the overall properties of the composition. In general, there should be on the order of at least 1 percent, and generally there should be in excess of 5 percent. Amounts much in excess of 15 percent will not provide a significant improvement in properties. Thus, the amounts shown in the examples represent the optimum concentrations of the solute. The amount of the powdered inert carrier material is not critical but need merely be sufficient to prevent undue glomeration of the particles and undue tackiness of the overall final product.

In using the product of the present invention as a pesticide, the product is dusted on to the growing plants in the same manner and at the same growth stages as these phosphorothioates have been applied in the past. The quantity of pesticide applied in a single field treatment does not differ significantly from prior dosages. The main difference is noted in the number of treatments required; thee present invention requires very substantially reduced number of applications due to its longer period of effectiveness.

While the foregoing procedure very significantly protects the phosphorothioate pesticide against excessive loss due to evaporation and/or decomposition or degradation due to hydrolysis, a significant degree of decomposition or degradation is still observed. This remaining decomposition and/or degradation has been found to result from microbiological attack. Warm, moist soil always contains bacteria and fungus which attack the phosphorothioates. In prior phosphorothioate compositions, the loss of phosphorothioate due to volatilization and hydrolysis were so great that microbiological attack was not a predominant concern. The frequent applications of the phosphorothioate pesticides compensated for the loss of pesticide. The great resistance of the compositions of the present invention to volatilization and hydrolsis permits the retention of the compositions in contact with the soil for extended periods of time without the necessity for frequent applications. In this new method of application, therefore, microbiological attack can become significant.

Accordingly, the inclusion of very small quantities of bactericidal or bacteriostatic and fungicidal or fungistatic materials, when properly employed in combination with the solute disclosed previously herein, can effectively protect the composition against microbiological attack and thus extend still further the effective life of the pesticidal composition. In general, an amount of from about 0.01 percent to about 10 percent (by weight, based on solvent free insecticidal composition) of these materials has been found useful for this purpose.

Examples of the agents useful for minimizing microbiological attack are as follows:

Copper compounds – copper salts of long chain fatty acids, including copper oleate, copper stearate and copper octoate; copper naphthenate; and copper 8-hydroxy-quinolinolate.

Phenol compounds - phenol and the oil or hydrocarbon solvent soluble phenols and derivatives; halophenols, particularly o-benzyl-p-chlorophen (Santophen I made by the Monsanto Chemical Company); o-phenylphenol; chloro-ortho-phenylphenol; pentachlorophenol; tetra-chlorophenol; chloroxylenol; chlorocresol; chlorobenzylphenol; methylene-bis (trichlorophenol); and the salts of the foregoing which are soluble in the pesticides; alkyl phenols having an alkyl group of 2–28 carbon atoms in the molecule including the various cresols, o-, and p- ethyl phenol, p-isopropyl phenol, p-tertiary-butyl phenol, 2-methyl-4-dodecyl phenol, o-hexadecyl phenol.

Organo-mercury compounds - phenyl-mercury octoate.

The foregoing compounds are introduced into the composition of the present invention by dissolving them or dispersing them in the phosphorothioate, in the protective matrix, or in both. They may also be employed by dusting, spraying or coating the surface of the granular composition. The preferred method, however, is to include the additive in the matrix or in the phosphorothioate for maximum effectiveness.

Coal tar, pitch and wood creosote contain sufficient of the above phenolic compounds to provide the desired bacteriostatic and fungistatic properties to be suitable as part or all of the protective material for the phosphorothioate pesticides. Coal tar pitch additionally possesses sufficient moisture resistance to serve as the sole protective agent against both hydrolysis and microbiological degradation. Accordingly, coal tar pitch is one of the preferred agents for incorporation in the composition of the present invention.

Expanded vermiculite, as noted previously, is the preferred carrier for low density granules of the composition of the present invention. Degradation of phosphorothioates may, in some instances, be accelerated in the presence of natural clay granules. If granules of higher density than are obtainable with vermiculite are desired, high temperature calcined and acid washed clay granules can be employed. Additionally, pigment-extender grade barium sulfate (barytes or blanc-fixe) calcined at about 1,100° C to form porous granules also serves as a satisfactory carrier for phosphorothioate pesticides. Calcined clay granules which have been pretreated with materials for reducing the catalytic activites of clays, for example, diethylene glycol, can also be used as a carrier for the purposes of the present invention.

In all of the foregoing examples, the protective solutes had melting points below about 100° C. This was necessary due to the manner of mixing the solutes with the phosphorothioate compounds, viz, melt mixing. Higher temperature melts could, on mixing with the insecticides, lead to significant decomposition of the phosphorothioate. This problem can be avoided, however, by utilization of readily volatilizable solvents which will dissolve and be compatible with both the phosphorothioate and the protective solute. Typically, the materials are dissolved in the solvent, and the phosphorothioate is added at a temperature well below 100° C, the porous carrier is impregnated with the solution and the solvent is evaporated at elevated temperature not exceeding about 100° C. The following examples typify this procedure.

The following examples illustrate preferred embodiments of the present invention.

EXAMPLE IX

The following composition was prepared:

| | | Parts by weight |
|---|---|---|
| Diazinon | | 25.0 |
| Oxidized asphalt | | 25.0 |
| Toluene | | 100.0 |
| Cupric oleate (Cu 6%) | | 1.0 |
| Expanded Vermiculite granules | | 225.0 |
| | Total | 376.0 |

The oxidized asphalt used in this composition was a petroleum asphalt with a melting point of 180/220° F and was supplied by the Humble Oil Refining Company. The oxidized asphalt and the cupric oleate were dissolved in the toluene at about 60° C. The toluene solution was cooled to below 50° C and the Diazinon added and mixed.

The expanded vermiculite was placed in a jacketed ribbon blender, heated to about 40° C and the Diazinon solution was sprayed on the surface of the vermiculite while the blender was continuously operated. When all the solution was added, the operation of the blender was continued for an additional 10 minutes to complete the impregnation of the vermiculite granules by the solution. The toluene was stripped from the material by evaporation at about 40° C.

EXAMPLE X

Example IX was repeated except that no copper oleate was used, and 10 percent of the asphalt was replaced by an equal weight of coal tar.

EXAMPLE XI

Example X was repeated except that the coal tar was replaced by an equal weight of wood creosote.

EXAMPLE XII

The following composition was prepared:

| | | Parts by weight |
|---|---|---|
| o-benzyl-p-chlorophenol | | 2.0 |
| Pioneer Asphalt (220 M.P.) | | 100.0 |
| Toluene | | 100.0 |
| Diazinon | | 100.0 |
| Acid washed clay granules | | 800.0 |
| | Total | 1102.0 |

The o-benzyl-p-chlorophenol used in this example was Santophen I of Monsanto Chemical Company while the Pioneer Asphalt, a petroleum asphalt, was supplied by the Witco Chemical Company. The o-benzyl-p-chlorophenol was dissolved in the toluene. The asphalt was heated in an oven to 150° C, a temperature slightly higher than its melting point. The toluene was then added in increments to the molten asphalt with constant mixing until a homogeneous solution was obtained. The toluene lost by evaporation was replaced and the temperature of the solution was lowered to about 50° C and the Diazinon was added with constant mixing. The homogeneous solution was mixed with the acid washed clay which was preheated to about 40° C. The toluene was then stripped at reduced pressure at about 40° C.

EXAMPLE XIII

Example XII was repeated except that the carrier in this case was granular calcined barytes.

EXAMPLE XIV

The following composition was prepared:

| | | |
|---|---|---|
| Copper Naphthenate (Cu 6%) | | 1.0 |
| Carnauba wax flakes | | 25.0 |
| Toluene | | 100.0 |
| Diazinon | | 25.0 |
| Corn Cob granules | | 225.0 |
| | Total | 376.0 |

The corn cob granules used in this Example were Grade No. 10/30 (Grit-)'Cob supplied by D. Anderson of Maumee, Ohio. The carnauba wax was molten and the toluene was mixed with the molten wax and the mixing continued until a clear solution was obtained. The copper naphthenate was then added and the temperature of the solution lowered to about 60° C. The Diazinon was then added and mixed. The resulting homogeneous solution was mixed with the corn cob grits at about 60° C.

EXAMPLE XV

Example XIV repeated with the carnauba wax replaced by an equal weight of an ozokerite wax (Hoeschst Wax S) and the copper oleate by the same weight of pentachloro-phenol.

EXAMPLE XVI

Example IX was repeated but with copper oleate held out of the composition. The copper oleate was applied by spraying a 2 percent toluene solution of it to the surface of the granular composition. The toluene was stripped from the material at about 50° C and at reduced pressure.

EXAMPLE XVII

Example XII was repeated but with the o-benzyl-p-chlorophenol held out and applied to the granular composition by spraying a 2 percent hexane solution of it to the surface of the granules. The hexane was allowed to evaporate from the granular material in a slow current of air at room temperature.

EXAMPLE XVIII

Example XVII was repeated except that the solution of the o-benzyl-p-chlorophenol was absorbed on finely powdered expanded vermiculite, and then the solvent substantially evaporated from the powder. The dry powder, containing about 5 percent o-benzyl-p-chlorophenol was then dusted to the surface of the granular composition to result in 0.1 percent of chlorophenol based on the total weight of the granular composition.

The products of Examples IX and XVIII were tested in greenhouse tests in topsoil obtained from corn fields. The tests were conducted up to nine weeks at 30° C and 90 percent humidity and at a pesticide level of 0.05 of the pesticide composition on the weight of the dry soil. The residual kill ratio for insects and insect larvae were determined at 1, 3, 5, 7 and 9 weeks. Insects and larvae included in these tests were corn rootworm, cutworm and wireworm. As a control, the same insecticides were applied to the same carrier at the same concentration as the corresponding test sample. Secondary controls were the same insecticides combined with the same solutes as the test sample but without the bactericide or fungicide used in the test sample.

All primary controls lost their activity in 1 to 3 weeks. The secondary controls showed reduced activity after three weeks and loss of activity in the five weeks' test. The samples represented by the examples showed full insect killing activity for seven weeks and only slight loss of activity in the 9 weeks' tests.

EXAMPLE XIX

A solution was prepared by dissolving 25 parts by weight of a maleic-modified resin ester (Lewisol 28, a product of Hercules Chemical Co.) which had a melting point of 141° C., and 25 parts by weight of Diazinon in 100 parts by weight of benzene at 30° C. The solution was absorbed on 225 parts by weight of calcined clay-sericite granules which are sold commercially under the name "Tru-sorb." This material comprises calcined clay-sericite granules, commonly of −24 + 48 mesh (Tyler) grain size, and has a typical chemical analysis as follows:

| | |
|---|---|
| Silica ($SiO_2$) | 85.40% |
| Aluminum Oxide ($Al_2O_3$) | 4.48% |
| Iron Oxide ($Fe_2O_3$) | 0.88% |
| Calcium Oxide (CaO) | 0.20% |
| Magnesium Oxide (MgO) | 0.54% |
| Sodium & Potassium Oxides ($R_2O$) | 0.15% |
| Loss On Ignition (largely combined water) | 8.35% |
| | 100.00% |

Spectographic analysis confirmed the chemical analysis and additionally indicated a small titanium content and traces of lithium, copper, chromium and manganese. The material exhibits a pH of 7-7.2, has a density of 38 lbs/ft$^3$ and a lube oil absorbency of 79 percent.

The solution-impregnated granules were dried in a current of air at about 40° C., until substantially all of the benzene had evaporated. The resulting product, when applied to surface soil, retains its insecticidal activity in the upper 10 cm. of soil with little or no leaching loss to depths below about 12.5 cm. even three weeks after field application.

EXAMPLE XX

Example XIX was repeated except that the maleic-modified resin ester was replaced by an equal amount of a phenolic-modified pentaerythritol ester of resin (Pentalyn 802A, manufactured by Hercules Chemical Corporation) which had a melting point of 170° C. The product has properties essentially the same as the product of Example XIX.

EXAMPLE XXI

Example XIX was repeated except that the maleic-modified resin ester was replaced by an equal amount of a glycerol ester of polymerized resin (Poly-Polo Ester 10 manufactured by Hercules Chemical Corporation) which had a melting point of 114° C. The product has properties essentially the same as the product of Example XIX.

It will be seen from the foregoing that the resinous and/or waxy materials useful as solute protectants for the purposes of the present invention may be described as members of the group of waxes, resins, bitumens, tars and pitches, many of which are described in the preceding examples. In addition, typical waxes include carnauba, beeswax, candelilla and other vegetable and insect waxes, hydrogenated fatty-acid glycerides, hydrogenated castor oil, ozokerite (Hoeschst Wax S) and oxidized ozokerite waxes (X-22 of Hoeschst Chemical Co.) and their modifications, paraffin waxes, oxidized paraffin waxes, and microcrystalline waxes (Multi-wax W-445, Witco Chemical Co.). Typical resins include wood and gum resin, resin esters, e.g., pentaerythritol ester of resin (Pentalyn 255 of Hercules Chemical Co.) terpene resins (Piccolite A-115 of Pennsylvania Industrial Chem. Corp.), gum damar, gum copal alkyd resins, oil modified alkyds, polystyrene (Dow resin PS-2), polyacrylates and polymethacrylates, cellulose esters and ethers (ethyl cellulose, 7 cps grade, Hercules Chemical Co.) polyvinyl esters and ethers and shellac. Typical bitumens include gilsonite, petroleum asphalt (Pioneer 180 and Pioneer 220 of Witco Chemical Co.), oxidized asphalt (180/200° F melting point, Humble Oil and Refining Co.). Typical tars and pitches include coaltar and coaltar pitches, wood creosote, wood pitch, and bone pitch.

What is claimed is:

1. A pesticidal composition consisting essentially of an inert porous carrier on which is absorbed a solution of about 1 to about 15 percent of a normally solid petroleum asphalt having a melting point below about 100° C in a phosphorothioate pesticide selected from the group consisting of 0,0-diethyl 0-(2-isopropyl-4-methyl-6-pyrimidinyl) phosphorothioate, 0,0-dimethyl S-(1,2-dicarbethoxyethyl) phosphorodithioate and 0,0-diethyl o-p-nitrophenyl phosphorothioate, said composition having a minimization of losses of said pesticide due to hydrolysis and volatilization under ambient field conditions.

2. The composition of claim 1 which additionally contains about 0.01 about 10 weight percent based upon the weight of the composition of a member selected from the group consisting of bactericides and fungicides.

3. A pesticidal composition consisting essentially of an inert porous carrier on which is absorbed a solution of about 1 to about 15 percent of a normally solid oxidized petroleum asphalt having a melting point below about 100° C in a phosphorothioate pesticide selected from the group consisting of 0,0-diethyl 0-(2-isopropyl-4-methyl-6-pyrimidinyl) phosphorothioate, 0,0-dimethyl S-(1,2-dicarbethoxyethyl) phosphorodithioate and 0,0-diethyl 0-p-nitrophenyl phosphorothioate, said composition having a minimization of losses of said pesticide due to hydrolysis and volatilization under ambient field conditions.

4. The composition of claim 3 which additionally contains about 0.01 to about 10 weight percent based on the weight of the composition of a member selected from the group consisting of bactericides and fungicides.

5. A pesticidal composition consisting essentially of an inert porous granular carrier material in which is impregnated an evaporated solution of a phosphorothioate pesticide selected from the group consisting of 0,0-diethyl 0-(2-isopropyl-4-methyl -6-pyrimidinyl) phosphorothioate, 0,0-dimethyl S-(1,2-dicarbethoxyethyl) phosphorodithioate and 0,0-diethyl 0-p-nitrophenyl phosphorothioate and about 1 to about 15 percent of a normally solid petroleum asphalt in a compatible volatilizable solvent which is capable of being volatilized at a temperature below about 100° C, said pesticide, said petroleum asphalt and said carrier material being in intimate association with each other.

6. A pesticidal composition consisting essentially of an inert porous granular carrier material in which is impregnated an evaporated solution of a phosphorothioate pesticide selected from the group consisting of 0,0-diethyl 0-(2-isopropyl-4-methyl-6-pyrimidinyl) phosphorothioate, 0,0-dimethyl S-(1,2-dicarbethoxyethyl phosphorodithioate and 0,0-diethyl 0-p-nitrophenyl phosphorothioate and about 1 to about 15 percent of a normally solid oxidized petroleum asphalt in a compatible volatilizable solvent which is capable of being volatilized at a temperature below about 100° C, said pesticide, said petroleum asphalt and said carrier material being in intimate association with each other.

7. A process of preparing an improved phosphorothioate pesticide for agricultural use, the improvement being a minimization of losses of said pesticide due to hydrolysis and volatilization under ambient field conditions, comprising dissolving in a phosphorothioate pesticide selected from the group consisting of O, O-diethyl O-(2-isopropyl-4-methyl-6-pyrimidinyl) phosphorothioate; O, O-dimethyl S-(1, 2-dicarbethoxyethyl) phosphorodithioate and O, O-diethyl O-p-nitrophenyl phosphorothioate, a minor amount of from about 1 to about 15 percent of a normally solid petroleum asphalt having a melting point below about 100° C and absorbing the resulting solution on an inert porous carrier.

8. The process of claim 7, wherein said phosphorothioate pesticide is O, O-diethyl O-(2-isopropyl-4-methyl-6-pyrimidinyl) phosphorothioate.

9. The process of claim 7, wherein said inert porous carrier is expanded vermiculite.

10. A process of preparing an improved phosphorothioate pesticide for agricultural use, the improvement being a minimization of losses of said pesticide due to hydrolysis and volatilization under ambient field conditions, comprising dissolving in a phosphorothioate pesticide selected from the group consisting of O, O-diethyl O-(2-isopropyl-4-methyl-6-pyrimidinyl) phosphorothioate; O, O-dimethyl S-(1, 2-dicarbethoxyethyl) phosphorodithioate and O, O-diethyl O-p-nitrophenyl phosphorothioate, a minor amount of from about 1 to about 15 percent of a normally solid oxidized petroleum asphalt having a melting point below about 100° C and absorbing the resulting solution on an inert porous carrier.

11. The process of claim 10 wherein said inert porous carrier is expanded vermiculite.

12. The process of claim 10 wherein said phosphorothioate pesticide is O, O-diethyl O-(2-isopropyl-4-methyl-6-pyrimidinyl) phosphorothioate.

13. A process for preparing a phosphorothioate pesticide selected from the group consisting of O, O-diethyl O-(2-isopropyl-4-methyl-6-pyrimidinyl) phosphorothioate; O, O-dimethyl S-(1, 2-dicarbethoxyethyl) phosphorodithioate, and O, O-diethyl O-p-nitrophenyl phosphorothioate for agricultural pesticidal use, comprising dissolving said phosphorothioate, pesticide and a minor amount of from about 1 to about 15 percent of a water insoluble, normally solid, non reactive petroleum asphalt in at least one volatilizable solvent which is capable of being volatilized at a temperature below about 100° C, absorbing the resulting solution on an inert, porous, granular carrier material and evaporating said solvent to provide a composition comprising said phosphorothioate, said petroleum asphalt and said carrier material being in intimate association with each other.

14. The process of claim 13, wherein said phosphorothioate pesticide is O, O-diethyl O-(2-isopropyl-4-methyl-6-pyrimidinyl) phosphorothioate.

15. The process of claim 13, wherein said inert porous carrier is expanded vermiculite.

16. A process for preparing a phosphorothioate pesticide selected from the group consisting of O, O-diethyl O-(2-isopropyl-4-methyl-6-pyrimidinyl) phosphorothioate; O, O-dimethyl S-(1, 2-dicarbethoxyethyl) phosphorodithioate, and O, O-diethyl O-p-nitrophenyl phosphorothioate, for agricultural pesticidal use, comprising dissolving said phosphorothioate pesticide and a minor amount of from about 1 to about 15 percent of a water insoluble, normally solid, non reactive oxidized petroleum asphalt in at least one volatilizable solvent which is capable of being volatilized at a temperature below about 100° C, absorbing the resulting solution on an inert, porous, granular carrier material and evaporating said solvent to provide a composition comprising said phosphorothioate, said oxidized petroleum asphalt and said carrier material being in intimate association with each other.

17. A process in accordance with claim 16 wherein said inert porous powder is expanded vermiculite.

18. A process in accordance with claim 16 wherein said phosphorothioate pecticide is O, O-diethyl O-(2-isopropyl-4-methyl-6-pyrimidinyl phosphorothioate.

* * * * *